United States Patent [19]

Alt et al.

[11] 4,328,176
[45] May 4, 1982

[54] APPARATUS FOR DAMPING THE NOISE IN COOLING TOWERS

[75] Inventors: Werner Alt, Bochum; Siegfried Kretzschmar, Bochum-Oberdahlhausen; Hans-Joachim Wöhler, Bochum, all of Fed. Rep. of Germany

[73] Assignee: Balcke-Dürr Aktiengesellschaft, Ratingen, Fed. Rep. of Germany

[21] Appl. No.: 208,441

[22] Filed: Nov. 19, 1980

[30] Foreign Application Priority Data

Dec. 3, 1979 [DE] Fed. Rep. of Germany ....... 2948602

[51] Int. Cl.³ .............................................. B01F 3/04
[52] U.S. Cl. ........................... 261/111; 261/DIG. 11; 55/229
[58] Field of Search ............... 261/DIG. 11, 111, 110; 55/229, 246, 465, 463

[56] References Cited

U.S. PATENT DOCUMENTS

| | | | |
|---|---|---|---|
| 989,631 | 4/1911 | Mueller | 261/DIG. 11 |
| 1,490,254 | 4/1924 | Burhorn | 261/DIG. 11 |
| 1,647,281 | 11/1927 | Doyle | 261/DIG. 11 |
| 2,612,359 | 9/1952 | Simpson | 261/DIG. 11 |
| 3,081,987 | 3/1963 | Meek et al. | 261/DIG. 11 |
| 3,307,334 | 3/1967 | Jamison et al. | 55/229 |
| 4,215,080 | 7/1980 | Ribier et al. | 261/111 |

FOREIGN PATENT DOCUMENTS

| | | | |
|---|---|---|---|
| 2547719 | 4/1977 | Fed. Rep. of Germany | 61/DIG. 11 |
| 449157 | 6/1949 | Italy | 55/246 |

*Primary Examiner*—Tim R. Miles
*Attorney, Agent, or Firm*—Martin A. Farber

[57] ABSTRACT

An apparatus for damping the noise of water charged in a cooling tower onto the top of heat exchanger elements by a distributing device and dropping down from the bottom of the heat exchange elements into a collecting basin, by means of vertically inclined impact surfaces of rigid insert elements which are arranged above the collecting basin in the cooling tower. In order to avoid the direct impingement of drops of water onto the surface of the water without impairing access to the collecting basin even with a greatly varying level of water, the lower edge of the rigid impact surfaces is arranged above the maximum water level in the collecting basin and extended by a flexible guide tail which extends into the water of the collecting basin with a minimum water level. This guide tail can be pushed aside and held out of the way upon cleaning and continuously diverts the water film into the vertical direction so that a noisy separation of the water film is made impossible.

21 Claims, 5 Drawing Figures

APPARATUS FOR DAMPING THE NOISE IN COOLING TOWERS

The present invention relates to an apparatus for damping the noise of the water charged in a cooling tower onto the top of heat-exchanger elements by a distributing device and falling down from the bottom of said heat-exchanger elements into a collecting basin by the use of vertically inclined impingement surfaces of rigid insert elements which are arranged above the collecting basin in the cooling tower.

Apparatus for damping the noise of the water falling down from heat-exchanger elements in a cooling tower into a collecting basin is known in various embodiments. All of them use rigid insert elements which are arranged below the heat exchanger elements and above the collecting basin and have vertically inclined (herein meaning inclined relative to the vertical) impingement surfaces which prevent direct impingement of the drops of water falling from the bottom of the heat exchanger elements onto the surface of the water in the collecting basin. As insert elements conical or pyramidal insert bodies are used as well as flat or curved plates which are arranged parallel to each other and at such a distance apart that the entire surface of the collecting basis is covered by inclined impingement surfaces. Furthermore insert elements arranged in the form of gable roofs are known between which, however, there remain narrow slots within which the downwardly dropping water passes directly onto the surface of the water of the collecting basin.

Since the height of the water in the collecting basin of the cooling tower varies greatly depending on the weather and on operating conditions, the known insert elements have considerable disadvantages. Either areas are present between the inclined impingement surface within which the drops fall freely onto the surface of the water or the insert elements are made so long that they always-i.e. even with a minimum level of the water-dip into the water of the collecting basin, thereby not only resulting in a high consumption of material but also preventing or greatly impairing access to the collecting basin when the latter is to be cleaned.

The object of the present invention is to create a device for damping the noise of the water falling within a cooling tower from the bottom of the heat exchanger elements into the collecting basin which, without impairing access to the collecting basin, prevents the direct impingement of drops of water on the water surface even in the event of a strongly varying level of the water.

This objective is achieved by the present invention in the manner that the lower edge of the rigid impingement surfaces is arranged above the maximum water level in the collecting basin and is extended by a flexible guide tail which, with a minimum water level, extends into the water of the collection basin.

This guide tail which adjoins the lower edge of the rigid impingement surfaces leads the water flowing down on the vertically inclined impingement surfaces to the surface of the water of the collecting basin without the danger of free dripping, even in case of the minimum water level. In extreme cases, the maximum water level may be more than 100% above the minimum water level. The guide tail of the invention is flexible so that it can be pushed aside and kept out of the way without difficulty upon cleaning, so that, differing from rigid insertion elements, it does not form any substantial obstacle upon the cleaning of the collecting basin. Finally, the guide tail of the invention has the advantage that it continuously diverts the film of water into the vertical direction from the incline of the impingement surfaces so that an undesired noisy separation of the film of water is definitely avoided regardless of the angle of inclination of the impingement surfaces or the shape of the insert elements.

In accordance with another feature of the invention the insert elements may be formed in known manner of a grid consisting of a plurality of plates arranged parallel to and spaced apart from each other. Furthermore, it is possible to develop the insert elements in known manner as two plates arranged in the form of a gable roof, whereby material can be saved as compared with the grid-shaped arrangement of the insert elements.

When the insert elements are developed as a roof the flexible guide tails of adjacent plates come together, in accordance with another feature of the invention, in the space below and between their fixed lower edges so that assurance is had that no drops of water can impinge freely onto the surface of the water present in the collection basin. The guide tails which thus come together are either of the same length so that they extend jointly into the water of the collection basin even at minimum water level or-in a second possible embodiment-one of the meeting guide tails terminates above the minimum water level in the collecting basin. In this case, the water flowing down from this guide tail is transferred to the guide tail which extends down into the water of the collection basin.

The advantage of the coming together of the guide tails is that a common film of water is formed by two adjacent impingement surfaces of roof-shaped insert elements, which film is fed into the water of the basin as a closed vertical layer of water having a smooth surface on both sides. Due to the fact that both the surfaces of this film of water are smooth, a further damping of noise is obtained upon the impingement of the film of water onto the surface of the water. Finally, the development of two guide tails which meet in accordance with the invention has the advantage that the gap between the fixed lower edges of the insert elements can be made sufficiently large to permit the passage of even larger foreign bodies. Despite this greater distance between the impingement surfaces the entire surface of the water is covered by the guide tails whose flexibility is sufficient to permit the foreign bodies to fall through.

In accordance with another feature of the invention, the material of the flexible guide tail can cover the entire top side of the inclined impingement surfaces. The guide tails may be formed of a commercial plastic sheet or, in accordance with another feature of the invention, of a noise-damping mat having a roughened surface so that the impingement noises of the individual drops of water onto the inclined impingement surfaces are also damped. In order to prevent a floating up of the guide tails which extend down into the water, they can be loaded with weights, if necessary.

In order not to detrimentally influence the effect of the guide tails of the invention by deflection of the downwardly dropping water drops as a result of the incoming cool air, it is finally proposed in accordance with the invention that the impingement surfaces be aligned in the direction of the cooling air which enters the cooling tower. This means, for instance, in the case of a cellular cooler that the insert elements are aligned parallel to each other in the incoming direction of the cooling air. In the case of a natural-draft cooling tower of circular construction which the cooling air enters over the entire periphery, the insert elements are aligned in a radial direction.

In the case of the gable-shaped development of the insert elements, the guide tails, in accordance with another feature of the invention, are fixed in their position by superimposing a second gable-shaped insert element consisting of a single piece. This type of fixing in position has the advantage that the sheet can be rapidly replaced should it become damaged and that no additional fastening means are required for the attachment.

Various illustrative embodiments of the damping device of the invention are shown in the drawings, in which.

Figure 1:
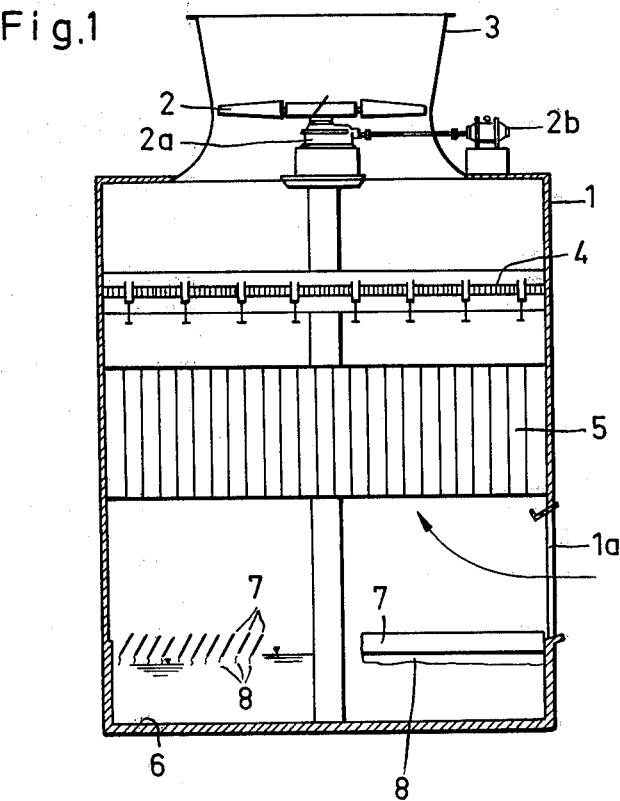
FIG. 1 is a vertical section through a diagrammatically shown cellular cooler having the damping device of the invention with the plates turned 90 degrees in the left-hand lower portion shown in the cross-section.

The cellular cooler shown in FIG. 1 as basis for the explanation of the damping device has a housing 1 of rectangular section which is provided with a cooling air inlet 1a on one side. On the top of the housing 1 a fan 2 is arranged in a fan housing 3, the fan being driven by a motor 2b via a gearing 2a.

Below the circular intake opening of the fan 2 there is present in the housing 1 a distributing device for the cooling water which, in the embodiment shown, sprays this cooling water by means of spray plates 4 onto the top of heat and material exchanger elements 5 which in their turn are arranged above the cooling air inlet 1a in the housing 1 and, in direct heat exchange between vertically upwardly flowing cooling air and cooling water which flows vertically downwardly on the heat and material exchanger elements 5, effect the cooling of the cooling water.

The water which has been cooled by the cooling air drops from the bottom of the exchanger elements 5 and is collected in a collecting basin 6 which is formed at the bottom of the housing 1. In order for the noise of the downwardly dropping cooling water to be damped, a damping device is arranged above the collecting basin 6 and below the lateral cooling-air inlet 1a. In the embodiment shown in FIGS. 1 and 2 this damping device comprises of a plurality of inclined plates 7 which are arranged parallel to and spaced apart from each other and consist, for instance, of asbestos cement. These plates 7 form a grid which prevents impingement onto the free water surface of the collecting basin 6 of drops of water falling down from the heat exchanger elements 5. The drops of water in all cases come against the inclined impingement surface of one of the plates 7 and flow down in the form of a film of water on the top side of the plates 7.

Figure 2:
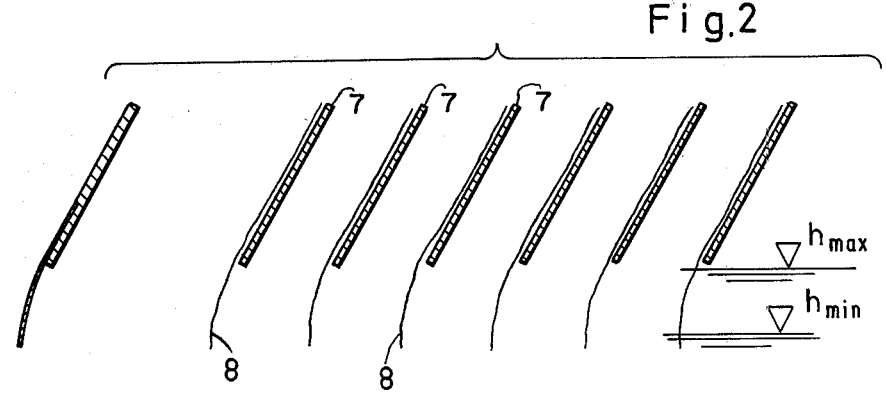
FIG. 2 shows a portion of the damping device of the cellular cooler of FIG. 1 on a larger scale.

As shown both in FIG. 1 and even more clearly in FIG. 2, the lower edges of the rigid plates 7 are arranged above the level of the water in the collecting basin 6 even at the maximum water level hmax. At the minimum water level hmin, which may lie considerably below the maximum water level hmax, there is thus obtained a considerable distance between the lower edges of the plates 7 and the surface of the water.

In order to prevent free fall onto the water surface in the collecting basin 6 of the film of water flowing down from the top side of the plates 7, the lower edge of each plate 7 is extended by a flexible guide tail 8 which extends into the surface of the water even in the case of a minimum water level hmin. These guide tails 8 deflect the film of water flowing down on the top of the oblique guide surfaces of the plates 7 not only out of the direction inclined from the vertical into the vertical direction without the danger of separation but conduct it into the surface of the water even in case of a minimum water level hmin so that dripping noises are definitely avoided. Due to the flexibility of the guide tails 8 which in the embodiment of FIG. 2 are fastened in the region of the lower edge of the plates 7, access to the collecting basin 6 is not impaired when it is to be cleaned. The guide tails 8 can be pushed aside or held up without difficulty.

Figure 3:
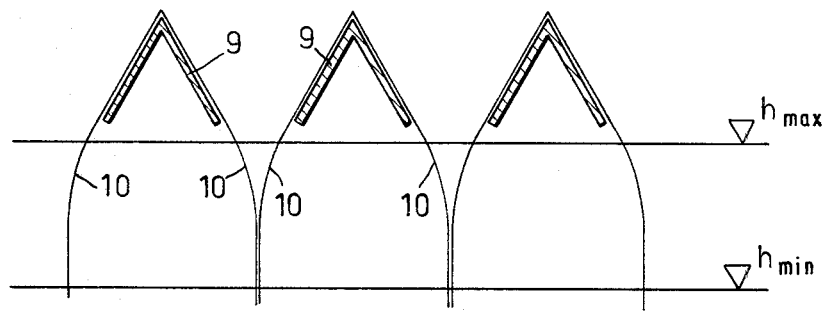
FIG. 3 shows a second embodiment of the damping device, seen in cross section.

In the case of the second embodiment, shown in FIG. 3, the insert elements which are formed with impingement surfaces for the water flowing down from the heat exchanger elements 5 are of gable-roof shape. The insert elements are formed of angle plates 9 of V-shaped cross section with their apex pointing towards the top. The ends of the arms of the angle which form the lower edges of the rigid angle plates 9 are spaced laterally from each other so that the impingement surfaces formed by the surface of the angle plates 9 do not cover the entire surface of the collecting basin 6. The spaces between the lower edges of the angle plates 9 are, however, covered by in each case two guide tails 10, hanging down from the lower edge of the angle plates 9. These guide tails 10 contact each other in the space below and between the fixed lower edges of the angle plates 9 so that the entire surface of the collecting basin 6 is covered by the angle plates 9 and the guide tails 10.

The water dripping downwardly onto the surfaces of the angle plates 9 and the guide tails 10 is in this way conducted downwardly as a film of water into the water present in the collecting basin 6, thus obtaining the advantage, as shown in FIG. 3, that both surfaces of the slice-like film of water formed between the abutting guide tails 10 are smoothed, as a result of which not only is the occurrence of noise prevented but unavoidable noises are subjected to an additional damping. The distance between the lower edges of the angle plates 9 is sufficiently large that even larger foreign bodies can drop through, particularly as the flexible guide tails 10 move away to permit the passage of such foreign bodies.

In the embodiment shown in FIG. 3, the material of the guide tails 10 covers the entire surface of the angle plates 9. In this way there is obtained not only a simple possibility of attachment for the guide tails 10 but also an additional damping of the noise if these guide tails 10 are formed from sound-damping material, having, for instance, a roughened surface. As a result of the roughened surface, the drops of water impinging on the impingement surfaces of the angle plates 9 are broken up, thus resulting in a considerable damping of noise.

Figure 4:
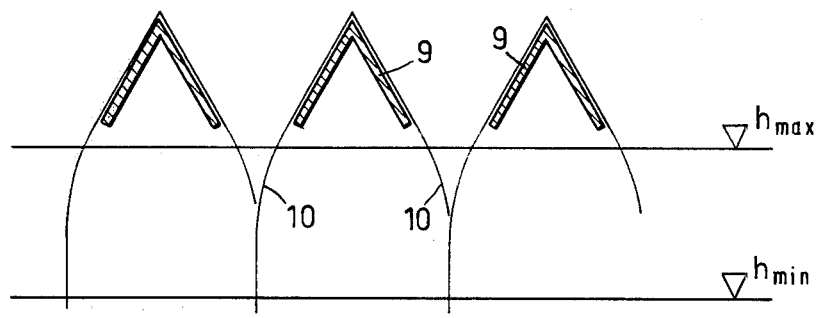
FIG. 4 is an alternative embodiment to FIG. 3.

While in the embodiment of FIG. 3 the contacting guide tails 10 of adjacent angle plates 9 are formed of the same length, FIG. 4 finally shows a development which saves material and in which one of the adjacent guide tails 10 is only sufficiently long such that its lower edge meets the adjacent guide tail 10 which only extends down into the minimum water level. The saving in material obtained in this manner does not result in any disadvantages with respect to the damping of the noise.

In order not to impair the effect on the one hand of the vertically inclined impingement surfaces of the plates 7 or the angle plates 9 and on the other hand of the guide tails 8 or 10 by the cooling air which enters laterally into the cooling tower, the plates 7 or angle plates 9 are aligned in the direction of the cooling air as it enters the cooling tower. This can be noted from FIG. 1. The right hand half of this figure shows that the longitudinal length of the plates 7 extends in the direction of the cooling air, which is indicated by an arrow in the region of the cooling-air inlet 1a. The plates 7 shown in the left-hand part of this figure are merely intended to show the cross sectional development and relative position with respect to each other of the plates. For this reason the showing of the plates 7 is turned 90° in the left-hand lower portion of FIG. 1.

Figure 5:
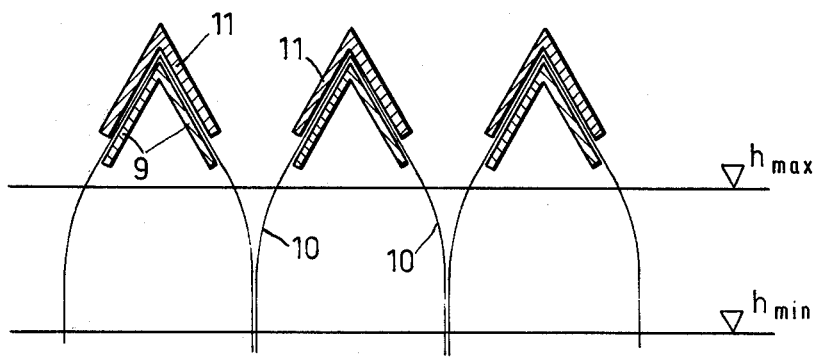
FIG. 5 is a fourth embodiment also shown in cross-section.

FIG. 5 shows how, in another embodiment, the guide tails 10 are held on the angle plates 9 by the resting force of other angle plates 11 which can be made of a suitable material (for instance, ceramics or earthenware).

What is claimed is:

1. In a device for damping the noise of water charged in a cooling tower onto the top of heat exchanger elements by a distributing device and falling from the bottom of the heat exchanger elements into a collecting basin by means of rigid insert elements having vertically inclined impingement surfaces, the insert elements being arranged above the collecting basin in the cooling tower, the improvement wherein
   each of said insert elements having at least one said inclined impingement surface, each said inclined impingement surface has a lower edge arranged above a predetermined operational maximum water level in said collecting basin,
   a flexible guide tail extends downwardly from one said lower edge of each of said insert elements to below a predetermined minimum water level in said collecting basin into the water.
2. The device according to claim 1, wherein
   said insert elements comprise a plurality of plates arranged parallel to and spaced from each other respectively,
   said plurality of plates form a grid.
3. The device according to claim 1, wherein
   each of said insert elements has the shape of a gable roof forming two of said inclined impingement surfaces, said two inclined impingement surface have two of said lower edges, respectively.
4. The device according to claim 3, wherein
   said flexible guide tail extends from one of said two lower edges,
   another flexible guide tail extends downwardly from the other of said two lower edges,
   each of said first-mentioned and said another flexible guide tails of adjacent of said insert elements contact in a space below and between said lower edges, respectively.
5. The device according to claim 4, wherein
   each said another flexible guide tail has the same length as said first-mentioned flexible guide tail and extends to below said predetermined minimum water level in said collecting basin into the water.
6. The device according to claim 4, wherein
   said another flexible guide tail extends downwardly from said other of said two lower edges to above said minimum water level in said collecting basin.
7. The device according to claim 1, wherein
   said flexible guide tails cover the entire top side of said inclined impingement surfaces, respectively.
8. The device according to claim 7, wherein
   said flexible guide tails are formed by a sound-damping mat having a roughened surface.
9. The device according to claim 1, further comprising
   means for weighing down said guide tails to prevent their floating up.
10. The device according to claim 1, wherein
    said cooling tower defines a cooling air inlet,
    said impingement surfaces of said insert elements are lengthwise aligned in a direction of said cooling air inlet of said cooling tower.
11. The device according to claim 10, wherein
    said cooling air inlet is located on one side of said cooling tower below said heat exchanger elements.
12. The device according to claim 3, further comprising
    angle plates disposed on said insert elements, respectively, said angle plates hold said guide tails on said insert elements by a resting force of said angle plates, said insert elements constitute angled plates.
13. The device according to claim 12, wherein
    said angle plates are made of ceramics.
14. The device according to claim 12, wherein
    said angle plates are made from earthenware.
15. The device according to claim 1, wherein
    said insert elements are horizontally elongated,
    said flexible guide tails are horizontally elongated corresponding to said insert element, respectively.
16. The device according to claim 15, wherein
    said insert elements each have an upper peripheral edge and are arranged vertically inclined parallel to each other and spaced apart such that said upper peripheral edge of said insert elements is vertically disposed overlapping said lower edge of an adjacent said insert elements.
17. The device according to claim 1, wherein
    said flexible guide tails have a lower portion extending vertically adjacent said minimum water level.
18. The device according to claim 4, wherein
    said two lower edges, respectively, of said two inclined impingement surfaces, respectively, are horizontally spaced apart from adjacent said lower edges of adjacent said insert elements, respectively, whereby together said flexible guide tails envelope an entire surface area of said collecting basin extending across all of said adjacent insert elements.
19. The device according to claim 1, wherein
    said flexible guide tail is fastened to said inclined impingement surface adjacent said lower edge.
20. The device according to claim 1, wherein
    said flexible guide tail is a plastic sheet.
21. The device according to claims 3 or 5, wherein
    said two lower edges of each of said insert elements are positioned at the same height.

* * * * *

UNITED STATES PATENT AND TRADEMARK OFFICE
CERTIFICATE OF CORRECTION

PATENT NO. : 4,328,176
DATED : May 4, 1982
INVENTOR(S) : Werner Alt, et al

It is certified that error appears in the above-identified patent and that said Letters Patent are hereby corrected as shown below:

Column 3 after Line 20 the following paragraph:

--Fig. 2a shows a modification with the guide tail placed on the plate covering only a bottom portion thereof;--

Signed and Sealed this

Seventh Day of September 1982

[SEAL]

Attest:

Attesting Officer

GERALD J. MOSSINGHOFF

Commissioner of Patents and Trademarks